A. F. EFFRIG.
DRINKING FOUNTAIN.
APPLICATION FILED DEC. 27, 1917.

1,270,504.

Patented June 25, 1918.

WITNESSES
Guy M. Spring
Dwight S. Fair

INVENTOR
Anthony F. Effrig

BY Richard B. Owen
ATTORNEY

UNITED STATES PATENT OFFICE.

ANTHONY F. EFFRIG, OF PERKASIE, PENNSYLVANIA.

DRINKING-FOUNTAIN.

1,270,504.　　　　　Specification of Letters Patent.　　Patented June 25, 1918.

Application filed December 27, 1917. Serial No. 209,100.

*To all whom it may concern:*

Be it known that I, ANTHONY F. EFFRIG, a citizen of the United States, residing at Perkasie, in the county of Bucks and State of Pennsylvania, have invented certain new and useful Improvements in Drinking-Fountains, of which the following is a specification.

This invention relates to troughs for watering poultry, and has for its primary object to generally simplify and improve the construction and operation of devices of this character as well as to increase the efficiency of the same.

A further object of the invention is to provide a watering trough of that type wherein the water is fed to the trough automatically from a reservoir as the water is removed or drunk from the trough, and which operates in such manner as to maintain the desired level of water in the trough at all times.

A further object of the invention is to provide a watering fountain of the character mentioned provided with improved means for preventing the water in the reservoir becoming violently agitated when air is admitted thereto.

A still further object of the invention is to provide a watering device operating in the manner stated which is equipped with a heater for maintaining the water in the reservoir at a relatively high degree, thus obviating the possibility of the water becoming frozen in cold weather.

With these objects in view, the invention consists in the novel construction, combination and arrangement of parts, all as will be described more fully hereinafter, illustrated in the drawings, and particularly pointed out in the claim.

Figure 1:
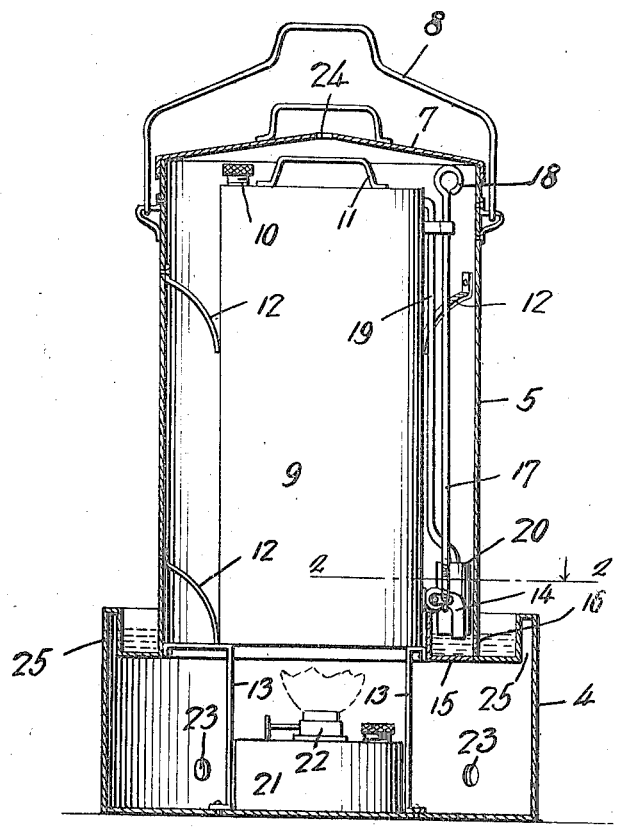
Figure 1 is a vertical sectional view taken through a watering fountain constructed in accordance with the invention.
Figure 2:
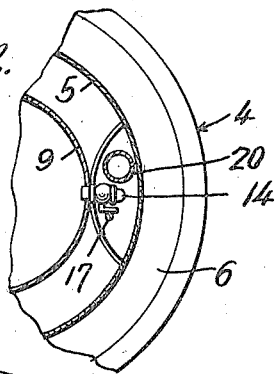
Fig. 2 is a fragmentary transverse sectional view taken upon the line 2—2 of Fig. 1.
Figure 3:
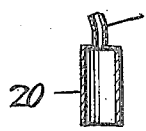
Fig. 3 is a detailed sectional view taken through the air nozzle used in carrying out the invention.

Referring now to the drawings, 4 indicates the body portion of the improved fountain, the said body being formed of metal and being of any desired size. The body in the present instance is of cylindrical shape, and the upper portion or dome 5 thereof is of less diameter than the bottom. The metal constituting the body is depressed at the juncture of the dome 5 with the bottom of the body, thus providing an annular trough 6, adapted to contain the water to be dispensed to the poultry. The upper end of the dome is closed by a cap or cover 7, and a handle 8 is connected to the body to facilitate the ready transportation of the fountain.

The reservoir for supplying water to the trough is indicated at 9, and comprises a cylindrical container removably inserted within the dome 5, and which is adapted to be filled through an opening in the upper end thereof closed by the screw cap 10. This reservoir is provided with a handle or bail 11 at its upper end to enable the said reservoir to be easily and quickly applied to and removed from the body.

The reservoir 9 is of less diameter than the dome 5, and is held within the latter concentrically by the inwardly projecting arms 12 secured to the inner surface of the said dome, and rests at its lower end upon the uprights 13 within the enlarged bottom portion of the body.

The tank or reservoir 9 is provided at its lower end with a relief valve or faucet 14 which extends downwardly into a chamber formed by the arcuate lip or collector 15, the latter being secured to the inner wall of the dome 5 at the lower end thereof, and being in communication with the trough 6 through the opening 16 in the said wall. The valve may be opened or closed by actuating the vertically disposed rod 17, the latter extending throughout the length of the tank 9 and being provided at its upper end with a finger loop 18.

An air inlet pipe 19 communicates at one end with the interior of the reservoir 9 at the extreme upper end thereof, and extends downwardly therefrom adjacent the faucet 14. The lower extremity of this air intake is enlarged, providing a bell or nozzle 20, the lower extremity of which is open and is disposed slightly above the lower extremity of the faucet 14.

Confined between the uprights 13 in the base of the body 4 is a lamp base 21, having a burner 22 disposed close to and directly beneath the bottom of the reservoir 9, and it is obvious that when the lamp is ignited the heat emanating from the burner will maintain the water in the reservoir at a relatively high temperature. The base of the body 4 may be provided with air inlet openings 23, while the cap or cover 7 may be provided with an opening 24 to permit of the escape of smoke and burnt gases.

It will be observed that the metal of which the body is formed is so bent or folded in providing the trough that the air pocket 25 is provided between the trough and the vertical wall of the base, the said pocket extending entirely around the said body. It is obvious, therefore, that the heat which will collect in this pocket will assist in maintaining the water in the trough at a warm temperature, thus preventing freezing of the liquid.

In operating the improved fountain, the reservoir 9 is filled and the cap 10 applied to the filling opening so as to prevent the admission of air to the interior of the tank. The reservoir is then positioned within the dome as shown in Fig. 1, the faucets 14 and nozzle 20 extending down into the collector or lip 15. The valve 14 is then opened by operating the rod 17, and liquid within the tank will flow therefrom until the liquid level in the trough closes the lower end of the nozzle. When this level of the water has been attained, the discharge end of the faucet will be disposed below the liquid level, thus preventing foreign matter which might be present in the trough from passing into the valve to choke or clog the same. Water removed from the trough by the poultry in sufficient quantity will be automatically replaced, as the lowering of the liquid within the trough below the mouth of the nozzle will permit air to pass upwardly through the intake pipe 19 to relieve the partial vacuum within the reservoir.

In cold weather, the lamp 21 may be ignited, and proper adjustment of the burner will cause the flame to sufficiently heat the water within the tank and trough to prevent freezing of the same.

From the foregoing it is obvious that I have provided a watering fountain which is of extremely simple construction and which will adequately perform the functions for which it is designed. The tank may be readily removed from the dome for filling or repair purposes, and when the parts are properly assembled, as shown in Fig. 1, the same will be protected from deterioration or destruction by the weather.

While the above is a description of the preferred embodiment of the invention, it is obvious that the invention is not necessarily limited to the exact structure and arrangement shown and described, as various changes in the minor details of construction and assemblage of parts may be resorted to without departing from the spirit of invention as defined by the claim.

I claim:

In a watering device, a cylindrical body having a reduced upper portion, a trough formed at the juncture of the said reduced portion with the base of the body and extending entirely around the latter, the outer walls of said trough being spaced from the body wall, a lamp in said base below the said trough, uprights in said base, a tank arranged concentrically within said reduced upper portion and resting upon said uprights, inwardly projecting arms in said upper portion engaging the sides of said tank, a cover for said upper portion, and a communication between said tank and said trough.

In testimony whereof I affix my signature in presence of two witnesses.

ANTHONY F. EFFRIG.

Witnesses:
 IRVIN Y. BARINGER,
 HANNAH BARINGER.

Copies of this patent may be obtained for five cents each, by addressing the "Commissioner of Patents, Washington, D. C."